UNITED STATES PATENT OFFICE.

ALEXANDER DANIEL ELBERS, OF HOBOKEN, NEW JERSEY.

PROCESS OF MANUFACTURING MINERAL WOOL.

SPECIFICATION forming part of Letters Patent No. 623,398, dated April 18, 1899.

Application filed November 19, 1898. Serial No. 696,908. (No specimens.)

*To all whom it may concern:*

Be it known that I, ALEXANDER DANIEL ELBERS, of Hoboken, in the county of Hudson and State of New Jersey, have invented a new and Improved Process of Manufacturing Mineral Wool, of which the following is a full, clear, and exact description.

The invention relates to an improvement in the manufacture of the substance known as "mineral wool," and has for its object the production of mineral wool that is more free from sulfur, and therefore of a better quality, than can be produced by the methods heretofore and now in use.

The invention consists in desulfurizing the material that is to be converted into mineral wool by smelting it in a cupola-furnace in admixture with gypsum or with other sulfates of the alkaline earths.

Mineral wool is usually made from blast-furnace slag that is more or less sulfurous and by the following methods:

First. The fresh-tapped slag is either flushed or conveyed from the blast-furnace to the blowing device, where it is made to flow in a small stream into a jet of steam or air. The resulting mineral wool is nearly as sulfurous as the slag from which it is blown, the term "sulfurous" meaning that the material contains soluble and easily-decomposable sulfids, chiefly those of calcium.

Second. Hardened blast-furnace slag is remelted in a cupola-furnace, with or without admixture of either basic or acid fluxes, such as limestone and quartz, and with coke as fuel, and the blowing device is adjusted under the tap-hole of the cupola, from whence the "smeltings," as I call the molten charges, flow into the steam-jets. The mineral wool produced by this method is less sulfurous than that of the preceding method, even when the hardened slag is remelted without fluxes, because some of the sulfid contents of the slag become oxidized by the blast of the cupola in remelting it. The consequent loss of sulfur, however, is not likely to amount under the most favorable conditions to as much as one-half of the total contents.

Third. In order to obtain mineral wool quite free from sulfur it has also been attempted to produce it entirely from non-sulfurous material—such as quartz, limestone, oyster-shells, &c.—and the resulting product is usually called "rock wool;" but as it is not practical to smelt such charges with charcoal, and as coke contains always more or less of sulfur, chiefly in the form of spent pyrites, which either go into the smeltings undecomposed or are reacted upon by free lime under formation of calcium sulfid, the rock wool produced in that manner is also slightly sulfurous.

My improvement applies to the second and third of the methods named, and it consists in adding to the cupola-charges gypsum or other sulfates of the alkaline earths. As gypsum is the cheapest and most abundant of these materials the others, which react in a similar manner, need not be herein considered.

The action of the gypsum is as follows: At the high temperature that obtains in the cupola-furnace near the twyers it melts, intermixes with the other constituents of the melting-charge, and then reacts on the contained sulfids under evolution of sulfurous-oxid gas. The respective reactions are expressed by the equation—

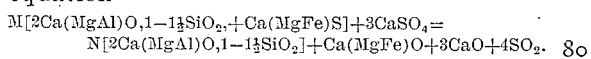

M[2Ca(MgAl)O,1−1¼SiO₂,+Ca(MgFe)S]+3CaSO₄ =
   N[2Ca(MgAl)O,1−1¼SiO₂]+Ca(MgFe)O+3CaO+4SO₂.

The theoretical requirement for desulfurizing the charges with calcium sulfate amounts, therefore, to twelve and three-fourths parts, by weight, of anhydrous or dehydrated gypsum for each per cent. of sulfur that is still retained by the smeltings. Thus if the sulfur-free composition for a rock wool takes up 0.1 per cent. of sulfur from the coke the smeltings might be completely desulfurized by adding to the charge about one and one-third per cent. of calcined gypsum, and a charge of hardened slag that carries one and one-half per cent. of sulfur might be desulfurized by adding about thirteen per cent., allowing that one-third of the sulfur will become oxidized by the blast of the cupola. The actual requirement may be somewhat larger, because some of the gypsum is apt to be superficially reduced to calcium sulfid by coming in contact with red-hot coke; but as the remelting of hardened slag in a small cupola as it is usually conducted is carried out with an oxidizing atmosphere this sulfid is reoxidized to sulfate, and hence it is not likely that the reducing action of the fuel will amount to much.

The invention may be carried out as follows: The cupola is charged with layers of coke, slag, and gypsum in the order named, or, when mineral wool is to be made from other materials than slag, with layers of coke alternating with layers of other materials, including the gypsum. This, as well as other details of the charging and smelting operations, as well as the suitable arrangements for converting the smeltings into mineral wool, are, however, well known and need not be here described, excepting as follows: The gypsum rock should be dry and hard and should be crushed to about nut size. If it crumbles to powder in going down with the burden of the cupola, it is apt to become so intimately intermixed with the fuel that it may become partly reduced to sulfid. The natural anhydrite ($CaSO_4$) would probably be the most suitable kind; but where that cannot be obtained it is best to try whether the natural hydrate ($CaSO_4, 2H_2O$) or the calcined rock gives the best results. If, however, it should be found that by the application of either method appreciable portions of the gypsum become reduced to sulfid, then it should not be charged with the other materials, but should be introduced into the furnace by charging it into a hopper that is attached to one of the twyers, so that it will be blown into the melting charge. For this purpose only calcined or anhydrous gypsum should be used, ground to about pea size. The proportions in which the gypsum is to be added to the charges are easily determined by a few trials, beginning with a small quantity and increasing it with the subsequent runs of the furnace. A slight excess does no harm, inasmuch as the sulfate that goes undecomposed into the mineral wool is not as injurious as the sulfids.

Instead of gypsum the sulfates of magnesium and barium may also be used; but they offer no especial advantages and are more expensive.

Having thus described my invention, I claim as new and desire to secure by Letters Patent—

1. The process of manufacturing mineral wool, consisting of remelting hardened blast-furnace slag in a cupola-furnace in admixture with sulfates of the alkaline earths and blowing the same into mineral wool.

2. The process of manufacturing mineral wool, consisting of remelting hardened blast-furnace slag in a cupola-furnace in admixture with gypsum, and blowing the same into mineral wool.

3. The process of manufacturing mineral wool, consisting of melting silicious and calcareous substances in a cupola-furnace in admixture with sulfates of the alkaline earths, and blowing the same into mineral wool.

4. The process of manufacturing mineral wool, consisting of melting silicious and calcareous substances in a cupola-furnace in admixture with gypsum, and blowing the same into mineral wool.

5. The herein-described process of manufacturing mineral wool, consisting in remelting hardened blast-furnace slag with an admixture of granulated gypsum, and then blowing the same into mineral wool, as set forth.

6. The process herein described of desulfurizing silicious and calcareous substances that are to be converted into mineral wool, consisting in melting said substances in a cupola-furnace, and delivering gypsum into the melting mass in the furnace, as set forth.

ALEXANDER DANIEL ELBERS.

Witnesses:
J. FRED. ACKER,
F. W. HANAFORD.